July 5, 1966     H. WEHDE ETAL     3,259,730
BALANCING METHOD AND APPARATUS
Filed Dec. 5, 1962     3 Sheets-Sheet 1

INVENTORS:
Heinz Wehde
Manfred Spreng
Rainer Schreieck
Heinz Schröpl

By: Spencer & Kaye
Attorneys

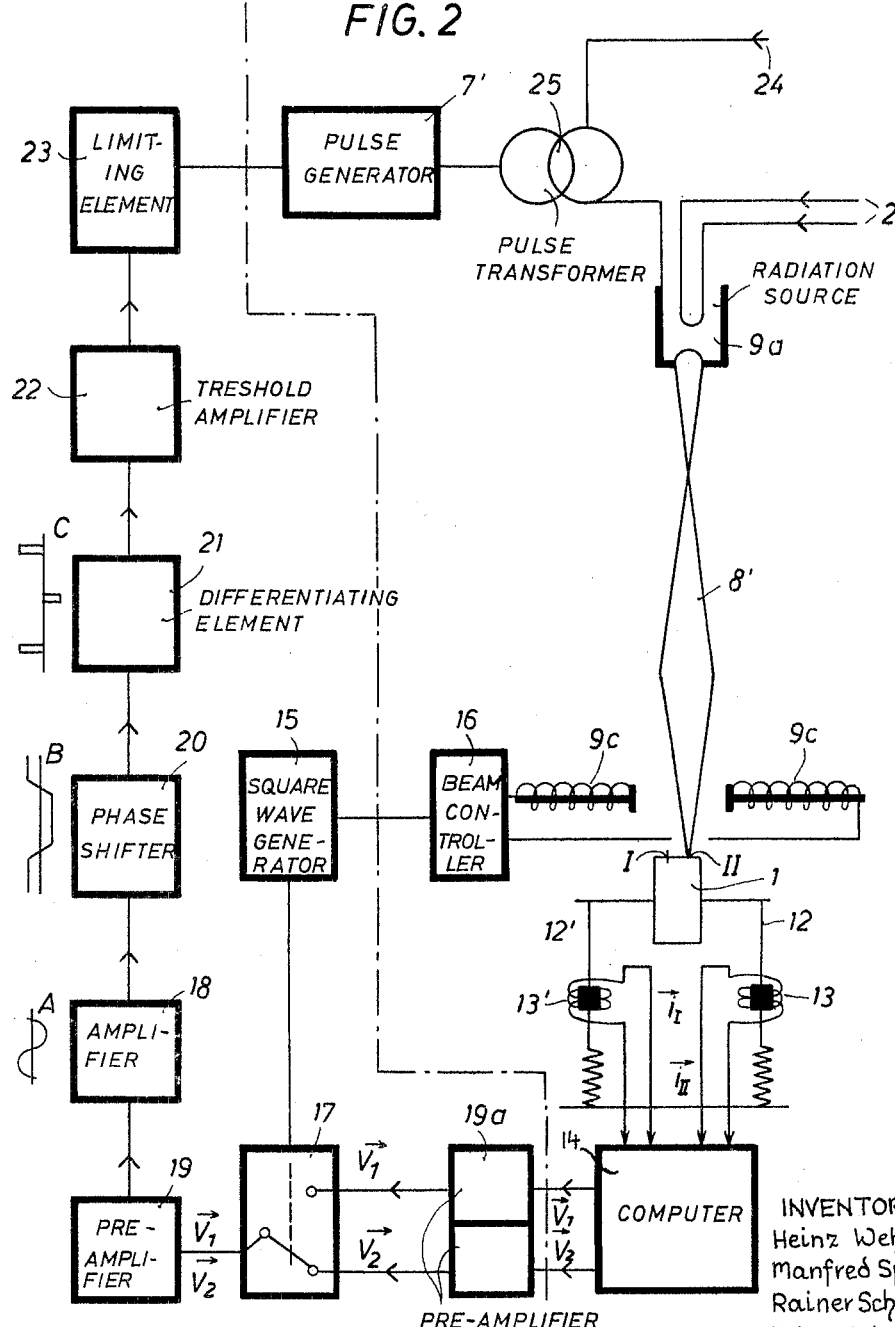

July 5, 1966 H. WEHDE ETAL 3,259,730
BALANCING METHOD AND APPARATUS
Filed Dec. 5, 1962 3 Sheets-Sheet 3
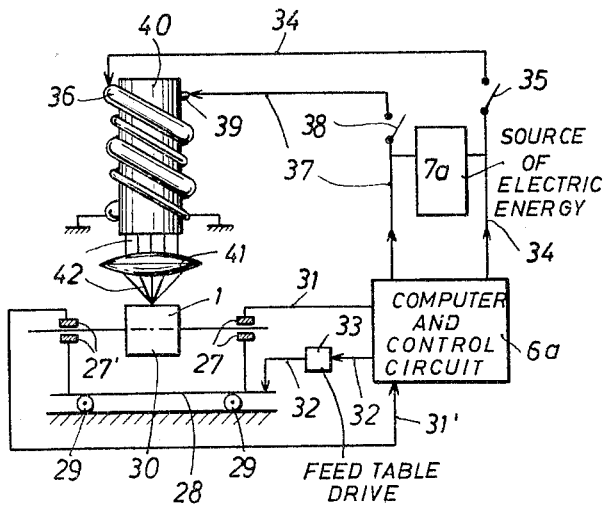
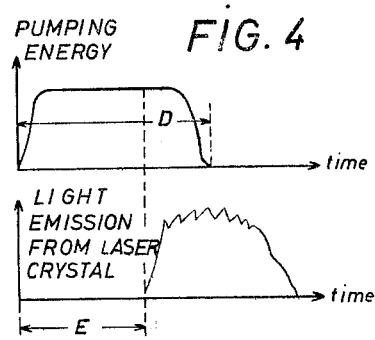
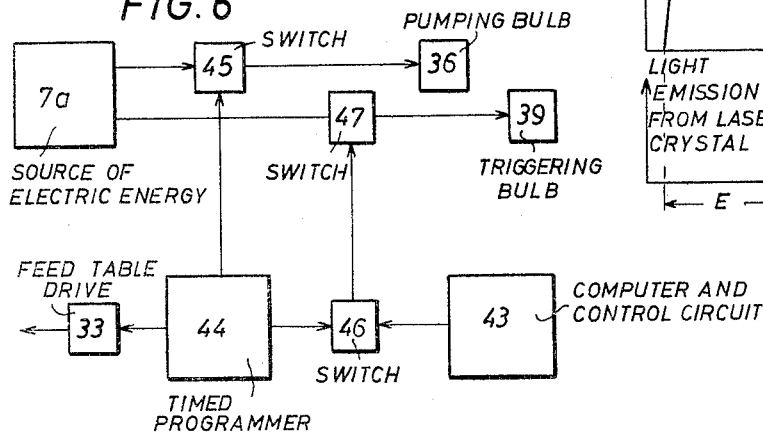
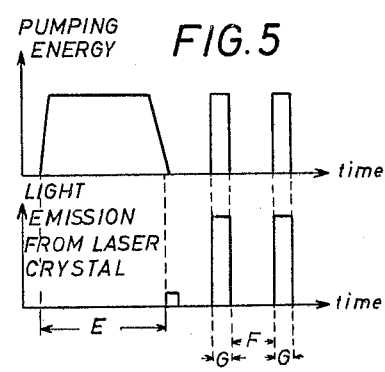
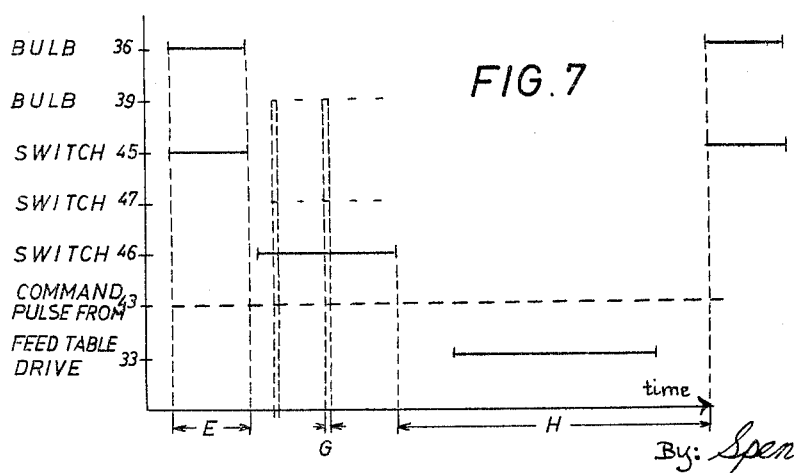
INVENTORS:
Heinz Wehde
Manfred Spreng
Rainer Schreieck
Heinz Schröpl
By: Spencer & Kaye
Attorneys United States Patent Office 3,259,730
Patented July 5, 1966

3,259,730
BALANCING METHOD AND APPARATUS
Heinz Wehde and Manfred Spreng, Wiesloch, Rainer Schreieck, Heidelberg-Wieblingen, and Heinz Schröpl, Schwetzingen, Germany, assignors to Teldix Luftfahrt-Ausrüstungs G.m.b.H., Heidelberg-Wieblingen, Germany
Filed Dec. 5, 1962, Ser. No. 242,447
Claims priority, application Germany, Dec. 14, 1961,
T 21,275
29 Claims. (Cl. 219—69)

The present invention relates to a method and apparatus for dynamically balancing rotating or pendulating bodies.

Conventionally, the balancing is done by determining the presence of unbalance portions and thereafter removing the same, this being done in two separate steps so that after any one unbalance portion has been eliminated, the remaining unbalance must be determined anew before it can be removed.

In contradistinction to the above, the present invention resides in determining the magnitude and phase position of the unbalance during the rotation or pendulating of the body to be balanced, and to remove a part of the unbalance at each rotation or pendulation, with periodic interruption if desired, by means of one or more beams focussed on the body to be balanced, until the body has been given the desired degree of balance. For the sake of simplicity, the term "rotation," as used throughout the instant specification and claims, will be deemed to include not only continuous rotation about an axis in one direction, but any turning movement about an axis in general, including "pendulation," namely, pivotal or oscillatory to and fro turning movement about a pivot or pendulum axis.

According to one embodiment of the invention, the material of the body to be balanced is removed by the action of a charge carrier beam, preferably an electronic beam.

According to another embodiment of the invention, the mass is removed by means of a light beam, preferably the coherent light beam of a laser (the latter being an acronym derived from Light Amplification by Stimulated Emission of Radiation).

It is known to determine the mass distribution of a body dynamically and thereby to measure the phase position of the unbalance. It is also known to remove material by means of an electron beam. More recently, it has also become known to perforate a work piece by the extremely high radiation intensity of a focussed laser beam. Finally, there exist control circuits for controlling such beams. What has not heretofore become known, however, is an arrangement according to the present invention, whereby a charge carrier beam, such as an electron beam or an electromagnetic beam, e.g., a laser beam, is focussed onto a work piece to be balanced while the work piece itself is in motion, i.e., in rotation or carrying out pendular movements, so as to remove material, the beam itself being continuously controlled by a gauge which measures the unbalance.

The present invention offers a number of advantages over the prior art wherein the determination and removal of the unbalance are carried out alternately. For one thing, the present invention saves a considerable amount of time. Furthermore, two or three-dimensional unbalances can be removed while the body is rotating at even the highest speeds, it thereby being possible to remove whatever material is necessary to obtain any desired degree of balancing. While it is true that the material is removed in a stepwise manner, this is done at each rotation or at each pendulation, as the case may be, with periodic interruptions if desired, and this occurs at such a rapid sequence that the material constituting the unbalance mass is removed for what may, for practical purposes, be deemed continuously.

According to the present invention, the intensity of the beam which removes the material is controlled in dependence of the ascertained magnitude and phase position of the unbalance. In the case of a pulsating beam, the instant at which each pulse is initiated is controlled by the ascertained phase position of the unbalance.

According to a further feature of the instant invention, not only the intensity of the material removing beam is controlled, but also, the position of the point at which the beam impinges upon the work piece, with respect to the pivot axis or axis of rotation of the work piece, is controlled either by deflection of the beam or by movement of the work piece.

According to a further feature of the present invention, the work piece can be subjected to not just one but to a plurality of beams capable of removing material. This is particularly useful in the case of relatively long work pieces, such as crank shafts, wherein the use of several beams saves even more time while retaining the same high degree of accuracy.

The present invention further resides in a fully automatic apparatus for carrying out the balancing, which apparatus comprises bearings for the work piece to be balanced located at points spaced from the center of gravity of the work piece and provided with vibration detectors which produce electrical voltages that are functions of the mechanical oscillations, the magnitude and phase of the output voltages being representative of the unbalance in a given plane normal to the axis. Furthermore, there are one or more control devices which are responsive to the detectors and which control the intensity of the beam or beams and which, if desired, also serve to control the beam or beams through the intermediary of suitable deflection means or to move the work piece carrier.

Additional objects and advantages of the present invention will become apparent upon consideration of the following description when taken in conjunction with the accompanying drawings in which:

FIGURE 2 is a schematic block diagram showing a beam control system of the type incorporated in the apparatus of FIGURE 1.

FIGURE 3 is a simplified illustration showing the use of a laser beam.

FIGURES 4 and 5 show graphs plotting pumping energy and light emission as functions of time.

FIGURE 6 is a block diagram showing how the laser may be controlled by a timed programmer.

FIGURE 7 shows the timed relationship of the various operations.

Figure 1:
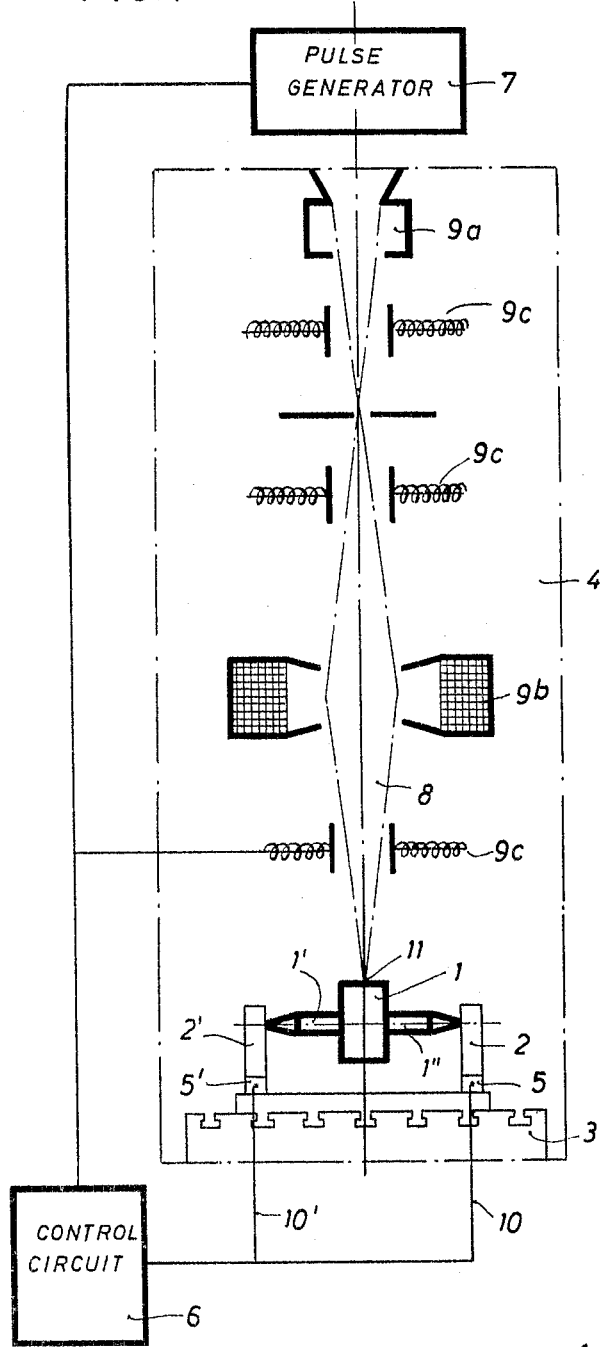
FIGURE 1 is a simplified elevational view of an apparatus according to the present invention.

Referring now to the drawings and to FIGURE 1 thereof in particular, the same shows a gyroscope 1 which is to be balanced, the same having axles 1' and 1" rotatably supported by bearings 2, 2', of a dynamic balancing apparatus mounted on a platen 3. FIGURE 1 also shows a charge carrier radiation system incorporating a source a charge carrier radiation system incorporating a source of radiation 9a and an electromagnetic system including a focussing coil 9b and deflection coils 9c for directing the charge carrier beam 8 onto the gyroscope, the platen 3 and the radiation system 9a, 9b, 9c being arranged within a housing indicated schematically at 4, this housing being maintained under a vacuum.

The support bearings 2, 2', are provided with vibration detectors 5, 5', which are electrically connected, via leads 10, 10', to a control circuit 6. The latter, in turn, controls one of the sets of deflection plates 9c and, via a pulse generator 7 which is connected to the source 9a, the intensity of the beam. In this way, the point 11 at which the focussed beam 8 impinges upon the work piece being balanced, in this case the gyroscope 1, can be shifted in the direction of the axis about which the gyroscope rotates.

The means for rotating the gyroscope are conventional and are therefore not shown.

The gyroscope will generally have an unbalance portion which is unsymmetrical in two planes. Therefore, as the gyroscope is rotated, the bearings 2, 2', will be vibrated, and this vibration is transformed into corresponding electrical voltages by the detectors 5, 5'. The latter will therefore apply corresponding input signals to control circuit 6, and, with each rotation of the gyroscope, the beam 8 will always be given the particular intensity necessary to remove material at the instant at which the unbalance portion of the gyroscope is in a position in which the beam impinges on the unbalance portion. The lowermost deflection plates 9c enable the impingement point 11 to be shifted axially, i.e., in a direct parallel to the axis about which the gyroscope rotates, so that the plane in which the balancing is carried out can be shifted without it being necessary physically to shift the workpiece.

In FIGURE 2, the spring-mounted bearings 12, 12' for the gyroscope 1 are shown schematically only. The bearings 12, 12', are associated with and excite two signal coils 13, 13'. In order to obtain a fixed phase relationship between the generated and the produced vibration, the spring constant of the spring system is so selected that the system vibrates substantially above its resonant frequency. The electron beam 8' can be directed into the balancing planes I and II which are at right angles to the axis of rotation, in which planes it is assumed there will be unbalance portions represented by $U_1$ and $U_2$. The balancing planes I and II are, in conventional manner, selected so as to take into account the fact that an unbalance is directly proportional to its distance from the plane of the center of gravity and proportional to the square of its distance from the axis of rotation. The currents $\vec{i}_{II}$ and $\vec{i}_{I}$ (the overscore arrow indicating vector quantities) generated by the signal coils 13 and 13', which are representative of the vibrations of the supports 12, 12', bear the following relation to the unbalances $\vec{U}_1$ and $\vec{U}_2$:

$$\vec{U}_1 = c_{11}\vec{i}_I - c_{12}\vec{i}_{II}$$
$$\vec{U}_2 = -c_{21}\vec{i}_I + c_{22}\vec{i}_{II}$$

These equations are solved by a computer 14 which puts out two voltages $\vec{V}_1$ and $\vec{V}_2$, the latter containing the information about the magnitude and phase of the unbalances in planes I and II.

The components shown to the left of the phantom line of FIGURE 2 are, essentially, those which constitute the control circuit 6 of FIGURE 1. This control circuit comprises a square wave generator 15 which is connected to a beam controller 16 which, in turn, is connected with deflection coils 9c, the arrangement being such that the beam is alternated between the two balancing planes I and II, the alternation occurring either every time that the beam strikes the gyroscope or after the elapse of a given time interval. The square wave generator is also connected to an electronic switch 17 by means of which either of the unbalance voltages $\vec{V}_1$, $\vec{V}_2$, depending on which of the two planes I and II the beam is caused to impinge, is passed on to an amplifier 18. In practice, there will be two pre-amplifiers 19a, 19b, interposed between the computer 14 and the electronic switch 17 for amplifying the voltages $\vec{V}_1$, $\vec{V}_2$, respectively. These amplifiers 19a, 19b, can be incorporated in and form part of the computer output circuit. Also, it will be expedient to incorporate a further pre-amplifier 19 connected between the output of switch 17 and the input of amplifier 18.

The output of amplifier 18 is connected to a phase shifter 20 which, in practice, is needed for the following reason: that portion of the work piece which constitutes the unbalance will, at the instant at which the bearings and vibration detectors 12, 13; 12', 13', generate a maximum signal, occupy a certain angular position at the periphery of the rotating work piece to be balanced. This angular position will not be one at which the unbalance portion is exposed to the beam 8'. This, in fact, will not occur until a little while later, e.g., a half a revolution of the work piece. Consequently, the voltage which brings about the beam intensity necessary for removal of material, in this case, the voltage which triggers the pulse generator 7', must be delayed somewhat with respect to the output voltage produced by the computer 14. This time delay is most easily brought about by means of the phase shifter.

The output of phase shifter 20 is connected to a differentiating element 21 which produces rectangular output pulses at the instants at which the output voltage of phase shifter 20 passes through zero. The amplitude of the rectangular output pulses is a function of the magnitude of the unbalance in the plane I or II. For purposes of explanation, FIGURE 2 shows the voltages A, B, and C of the signals passing through amplifier 18, phase shifter 20, and differentiating element 21, the abscissa or zero line of the voltage being oriented vertically.

The rectangular output pulses obtained from the differentiating element 21 are applied, via a threshold amplifier 22, to a voltage limiting element 23, which, in synchronism with the incoming pulses, delivers similar rectangular pulses of constant amplitude, for example, 15 volts, depending on whether or not the unbalance is greater than a predetermined value. The last-mentioned rectangular pulses, whose phase position corresponds to the phase position of the unbalance of the work piece, are then applied as triggering pulses to pulse generator 7', thereby causing the beam 8' to be applied at the proper instant.

It will be seen from the above that the limiter 23, which in the case of known apparatus for generating electron beams is used with a built-in pulse generator, keeps the intensity of the electron pulses which remove the material from the work piece constant, the pulses being applied until the unbalance of the work piece is below the given tolerance.

Finally, FIGURE 2 shows the lead-in 24 for the control voltage, the pulse transformer 25, and the heating filament leads 26 for the radiation source 9a.

If the electron beam is to be maintained stationary and the work piece carrier to be moved axially instead, the square wave generator will not be connected to the beam controller 16 but to a suitable drive for moving the platen 3 (FIGURE 1) or the supports and vibration detectors 12, 13; 12', 13' (FIGURE 2).

If two beams are used, one in plane I and the other in plane II, the square wave generator 15, the beam controller 16 with its deflection coils 9c, the intermediate amplifiers 19a and 19b, and the electronic switch 17 can be eliminated. The supports and detectors 12, 13; 12', 13', and the computer 14 remain unchanged, while two of each of the other components will be provided. It will readily be apparent that the computer 14 will then deliver the voltage $V_1$ pertaining to the unbalance in plane I to the system for producing the beam which strikes the work piece in that plane, while the voltage $V_2$ pertaining to the unbalance in the other plane II is applied to the other beam generating system.

If the material removing beam, instead of being a charge carrier, is a laser, it is not necessary that the operation be carried out under vacuum conditions. This greatly simplifies the practical considerations and allows the balancing of work pieces which could not heretofore be balanced by charge carrier beams, e.g., work pieces mounted in gas-lubricated bearings. Furthermore, the coherent light beam of a laser can be focussed very accurately onto an exceedingly small surface. The sole drawback of a laser beam, insofar as the present invention is concerned, is that laser apparatus today are not yet quite as developed as apparatus for generating charge carrier beams. Nevertheless, the present state of the art is already sufficiently advanced to allow the use of lasers for fine balancing.

In practice, the difference between the balancing apparatus using a laser and the apparatus using a charge carrier beam resides in the characteristics of the beam producing means, while the support for the work piece to be balanced and the means for determining the magnitude and phase position of the unbalance can be the same as depicted in FIGURES 1 and 2. FIGURE 3 therefore shows that portion of the apparatus schematically only. In particular, the gyroscope 1 or other work piece to be balanced is rotatably supported in vibration detectors 27, 27', which are carried by a feed table 28 having rollers 29 so that the work piece can be moved in the direction of the axis of rotation 30. The output of the vibration detectors 27, 27', is applied, via leads 31, 31', to the computer and control circuit 6a which itself is connected to the feed table 28 by means of leads 32 and a feed table drive 33 which is capable of moving the table to and fro. The circuit 6a is also connected, via leads 34 and switch 35, to a first flash bulb 36, and, via leads 37 and switch 38, to a second flash bulb 39, the power source being indicated at 7a. The flash bulbs 36 and 39 produce the light beam 42 emanating from the laser crystal 40 and focussed onto the work piece by means of the optical focussing means 41.

The laser arrangement shown in FIGURE 3 is designed so as to produce only pulses of light. The flash bulb 36 serves for the so-called optical pumping, i.e., for raising the ions contained in the crystal 40 from the ground level into a pack in excited conditions, from which, for example in the case of a ruby crystal, they fall back, without the emission of radiation, into two metastable levels (doublet) which are still above the ground level. Thus, the extent to which the ground level is populated by electrons is decreased without any light being produced. Only when the electron population level of the ground level is smaller than that of the metastable doublet, will the ions fall back into the ground state, with coherent light being emitted.

This process is explained in FIGURE 4. The duration D of the flash produced by bulb 36, which flash produces the so-called pumping energy, is about 0.3 millisecond. During the time interval E, lasting about 0.2 millisecond, only the metastable levels are populated. The light emission from the laser crystal 40 does not start until after the lapse of this time interval E of about 0.2 millisecond, and lasts, with fluctuation energy density, for several tenths of a millisecond, e.g., about 0.3 millisecond. This laser beam can be used for removing material from the work piece so as to balance the same. In that case, the lead 37, switch 38, and flash bulb 39 can be dispensed with.

FIGURE 5 shows another way in which the laser pulses can be produced. At first, the flash bulb 36 is supplied only with so much energy as is needed to make the electron population density in the ground state equal to that in the metastable states, i.e., the duration of the flash of bulb 36 is limited to the duration indicated by E, or little more. The crystal 40 will then emit no light pulse at all, or at most a short and weak pulse. Short light flashes of duration G, lasting about 5 microseconds, are produced thereafter by flash bulbs 39, the time interval F between these flashes being selectable, for instance about 100 microseconds. These flashes G immediately precipitate powerful laser pulses having approximately the same duration G. This so-called needle triggering can, with presently known lasers, be repeated five or more times. Such laser needle pulses, because of their sharpness and magnitude, have been found to be particularly useful for balancing purposes.

After a laser triggering carried out in accordance with FIGURE 4, or a series of needle triggerings as in FIGURE 5, it is generally necessary to allow a certain "cooling" time for the crystal before the next triggering can be carried out.

FIGURE 6 is a block diagram of a system for controlling the needle triggering. The system comprises component 43 which includes the computer 14, the preamplifier 19, the amplifier 18, the phase shifter 20, the differentiating element 21, the threshold amplifier 22, and the limiting element 23, all corresponding to the similarly numbered parts described in connection with FIGURE 2, so that during rotation of the work piece to be balanced, the component 43 will put out similar rectangular pulses whose phase position corresponds to the phase of the unbalance, as explained above.

The operation of the system of FIGURE 6 will be explained in conjunction with FIGURE 7 which shows the occurrence of certain events as functions of time. A programmer 44, by means of which the timing of the steps is controlled, first closes a switch 45 for about 0.2 millisecond, thereby connecting the voltage source to the flash bulb 36, as a result of which the latter will effect the optical "pumping," lasting throughout the time interval E shown in FIGURES 7 and 5. The switch 45 is then opened, whereupon the programmer 44 closes a switch 46 so that command signals coming from component 43 are applied to the switch 47. The latter, in turn, is closed, by each incoming pulse, for about 5 microseconds (time interval G in FIGURES 7 and 5). Every time the switch 47 is closed, a pulse is applied from the energy source 7a to the flash bulb 39, thereby effecting a needle triggering of the laser beam. In order to allow the crystal to cool, the switch 46 is opened not just prior to the closing of switch 45 but preferably as soon as the laser no longer emits a beam; this occurs, for example, after five needle triggerings, as shown in FIGURE 7. During the waiting time H, while the crystal "cools," the feed table drive 33 is caused to move the feed table 28 of FIGURE 3 (or the platen 3 of FIGURE 1) so that the other balancing plane will subsequently be exposed to the action of the laser beam when the programmer 44 initiates the next cycle of operation. This process is repeated until the component 43 ceases to apply pulses to the switch 46 which, of course, occurs as soon as the work piece has attained the desired degree of balance.

Instead of physically moving the work piece, the laser beam can be deflected optically so as to be effective in a different balancing plane. At present, however, such an arrangement is felt to be somewhat too complicated. Therefore, it is deemed more expedient, particularly in the case of relatively long work pieces, to provide a plurality of laser beams each of which is controlled by a respective control system.

There exist laser systems, presently under development, which do not operate on a pulse basis but continuously. The intensity of such lasers can be controlled by a system identical to the one for controlling a charge carrier, as depicted in FIGURE 2.

It will be understood that the above description of the present invention is susceptible to various modifications, changes, and adaptations, and the same are intended to be comprehended within the meaning and range of equivalents of the appended claims. For example, the present invention is not limited to the balancing of gyroscopes, since the work piece may be constituted by any body which has to be balanced, such as crank shafts, balance wheel pendulums, and others.

What is claimed is:

1. A method of balancing a rotating unbalanced work piece, comprising measuring the magnitude and phase position of the unbalance, and during rotation of the work piece removing portions of the unbalance mass, in two planes which are spaced axially from the center of gravity of the work piece and which are located axially, on opposite sides of such center of gravity, by means of at least one focussed beam until the work piece has attained the desired degree of balance.

2. A method as defined in claim 1 wherein the focussed beam removes a portion of the unbalance mass upon each rotation of the work piece.

3. A method as defined in claim 2 wherein the removal of the unbalance mass is periodically interrupted.

4. A method as defined in claim 2 wherein the focussed beam is a charge carrier beam.

5. A method as defined in claim 4 wherein said carrier beam is an electron beam.

6. A method as defined in claim 2 wherein the focussed beam is a light beam.

7. A method as defined in claim 6 wherein the light beam is the coherent light of a laser.

8. A method as defined in claim 2 wherein the intensity of the focussed beam is controlled as a function of the magnitude and phase position of the unbalance mass.

9. A method as defined in claim 2 wherein the point at which the focussed beam impinges upon the work piece is controlled by deflecting the beam in the direction of the axis about which the work piece rotates.

10. A method as defined in claim 2 wherein the point at which the focussed beam impinges upon the work piece is controlled by moving the work piece in the direction of the axis about which the work piece rotates.

11. A method as defined in claim 2 wherein portions of the unbalance mass are removed, during rotation of the work piece, by means of a plurality of focussed beams.

12. A balancing apparatus comprising, in combination:
 (a) means for rotatably supporting a work piece to be balanced at points spaced from the center of gravity of the work piece and for producing output voltages the magnitude and phase of each of which corresponds to the unbalance in a respective plane normal to the axis of rotation of the work piece;
 (b) means for generating at least one focussed beam which is able to remove a portion of the mass of which the work piece is made;
 (c) means causing the beam to impinge on the work piece in two planes which are spaced axially from the center of gravity of the supported work piece and which are located, axially, on opposite sides of such center of gravity; and
 (d) control means responsive to said voltages and connected to said beam generating means for causing the beam to remove the unbalance of the work piece during rotation thereof.

13. A balancing apparatus as defined in claim 12 wherein said control means further cause the point at which the beam impinges upon the work piece to be shifted in a direction parallel to said axis of rotation.

14. A balancing apparatus as defined in claim 12 wherein said support means are mounted for movement in a direction parallel to said axis of rotation and wherein said control means are connected to said support means for moving the same in said direction.

15. A balancing apparatus as defined in claim 12 wherein said beam generating means include means for deflecting the beam in a direction parallel to said axis of rotation and wherein said control means are connected to said beam deflection means, whereby the point at which the beam impinges upon the work piece is shifted in said direction.

16. A balancing apparatus as defined in claim 12 wherein said beam generating means are variable and wherein said control means are connected to said generating means for varying the intensity of the beam in response to said voltages.

17. A balancing apparatus as defined in claim 12 wherein said beam generating means emit pulsating beams and wherein said control means are connected to said generating means for commanding the instant at which a pulse is to be emitted.

18. A balancing apparatus as defined in claim 12 wherein said support means comprise a resiliently mounted bearing, a signal coil mechanically associated with said bearing, and a computer electrically connected to the output of said signal coil for producing said voltages.

19. A balancing apparatus as defined in claim 12 wherein said support means comprise two spaced apart spring-mounted bearings, each being mechanically connected with a respective signal coil which generates an electrical signal representative of the unbalance detected by its respective bearings, and a computer connected to the outputs of said signal coils for producing two output voltages containing information indicative of the magnitude and phase of unbalances in two respective planes normal to the axis of rotation of the work piece.

20. A balancing apparatus as defined in claim 19 wherein said beam generating means comprise deflection means for moving the point at which the beam impinges upon the work piece in a direction parallel to the axis of rotation of the work piece, and wherein said control means comprise a square wave generator whose output is connected to said deflection means, an electronic switch also connected to and actuated by the output of said square wave generator, said switch having two inputs connected, respectively, to two outputs of said computer whereat said two output voltages thereof appear, said switch having one output, a phase shifter having its input connected to said output of said switch, a differentiating element having its input connected to the output of said phase shifter, a threshold amplifier having its input connected to the output of said differentiating element, and a limiting circuit having its input connected to the output of said threshold amplifier, the output of said limiting circuit being connected to the input of said beam generating means.

21. A balancing apparatus as defined in claim 20 wherein said beam generating means comprise a source for emitting an electron beam, and a pulse generator having its output connected to said source, the input of said pulse generator constituting the input of said beam generating means and thus being connected to said output of said limiting circuit.

22. A balancing apparatus as defined in claim 19 wherein said support means are mounted for movement in a direction parallel to said axis of rotation, wherein said beam generating means comprise a laser crystal and flash bulb means for obtaining a laser therefrom, and wherein said control means are connected to said support means for moving the same in said direction and to said flash bulb means for causing the generation of the laser.

23. A balancing apparatus as defined in claim 22 wherein said flash bulb means comprise a pumping bulb and a needle triggering bulb to both of which bulbs said control means are connected.

24. A balancing apparatus as defined in claim 19 wherein said support means are mounted for movement in a direction parallel to said axis of rotation, wherein said beam generating means comprise a laser crystal, a pumping bulb and a triggering bulb, and wherein the apparatus further comprises a timed programmer, said control means being operative only to energize said triggering bulb and said programmer being operative to move said support means and to energize said pumping bulb.

25. A balancing apparatus as defined in claim 24 wherein said beam generating means comprise a first switch for connecting said pumping bulb to a source of electric energy, a second switch for connecting said triggering bulb to the source of electric energy, and a third switch connected to actuate said second switch, said control means being connected to said third switch and said programmer being connected to said first and second switches.

26. A balancing apparatus as defined in claim 25 wherein said support means include a feed table upon which said bearings are mounted, and a drive for moving said feed table, said programmer being connected to said drive for actuating the same.

27. A balancing apparatus as defined in claim 26 wherein said programmer is timed to actuate said feed table drive during the interval required between cooling of the laser crystal subsequent to energization of said triggering bulb and the energization, in the next cycle of operation, of said pumping bulb.

28. A balancing apparatus as defined in claim 12 wherein said beam generating means generate but a single beam.

29. A balancing apparatus as defined in claim 12 wherein said beam generating means comprise a plurality of generators for generating a plurality of beams, respectively, and wherein the apparatus comprises a plurality of control means responsive to said voltages, each control means being connected to a respective one of said plurality of beam generators.

References Cited by the Examiner

UNITED STATES PATENTS

| | | | |
|---|---|---|---|
| 2,322,561 | 6/1943 | Bevins et al. | 219—69 |
| 2,346,975 | 4/1944 | Laboulais | 219—69 |
| 2,989,614 | 6/1961 | Steigerwald | 219—50 |

OTHER REFERENCES

"Lasers," Electronics; Nov. 24, 1961, pp. 54–57.

"Taming the Laser Ray For Industry," Factory, vol. 120, No. 4; pp. 96–97, April 1962.

RICHARD M. WOOD, *Primary Examiner.*

JOSEPH V. TRUHE, *Examiner.*